United States Patent [19]

Williams

[11] 4,243,706

[45] Jan. 6, 1981

[54] ONE PACKAGE STABLE ADHESIVE AND METHOD OF USING THE ADHESIVE

[75] Inventor: Charles E. Williams, Bloomfield Hills, Mich.

[73] Assignee: Grow Group, Inc., New York, N.Y.

[21] Appl. No.: 943,236

[22] Filed: Sep. 18, 1978

[51] Int. Cl.$^3$ .............................................. B05D 3/02
[52] U.S. Cl. .................... 427/386; 156/330; 156/333; 260/31.8 M; 260/31.8 C; 260/31.8 HR; 427/208.2
[58] Field of Search ............ 260/31.8 M, 31.8 E, 260/31.8 HR, 837 PV; 427/386, 207 A; 156/330, 333

[56] References Cited

U.S. PATENT DOCUMENTS

| | | | |
|---|---|---|---|
| Re. 28,688 | 1/1976 | Cook | 260/4 |
| 2,605,254 | 7/1952 | Wolf | 526/318 |
| 3,032,460 | 5/1962 | Chipman et al. | 156/330 X |
| 3,383,337 | 5/1968 | Garling et al. | 521/75 |
| 3,418,274 | 12/1968 | Caplan et al. | 260/41 |
| 3,466,347 | 9/1969 | Davis | 260/837 R |
| 3,539,480 | 11/1970 | Groff et al. | 260/23 |
| 3,565,836 | 2/1971 | Fuller | 260/31.8 M X |
| 3,634,169 | 1/1972 | Garnish | 260/31.8 M X |
| 3,652,712 | 3/1972 | Ahmed et al. | 260/837 PV |
| 3,678,130 | 7/1972 | Klapprott et al. | 156/330 X |
| 3,723,379 | 3/1973 | Althouse et al. | 260/31.8 M |
| 3,803,267 | 4/1974 | Kuwahara et al. | 260/31.8 M X |
| 3,904,813 | 9/1975 | Groff | 174/68.5 |
| 3,971,743 | 7/1976 | Breslow | 526/13 |
| 4,055,541 | 10/1977 | Riew | 260/837 PV X |
| 4,070,225 | 1/1978 | Batdorf | 156/330 |
| 4,123,585 | 10/1978 | Sparzak et al. | 260/31.8 M X |

FOREIGN PATENT DOCUMENTS 1092005  11/1967  United Kingdom ............... 260/31.8 M

OTHER PUBLICATIONS

Ciba-Geigy *Tech. Bulletin* "Latex Hardners HY940 and HT 939".
B. F. Goodrich Chem. Co. *Tech. Bulletin* (GEON) "GEON 130X17 RESIN".

*Primary Examiner*—Ralph S. Kendall
*Assistant Examiner*—Thurman K. Page
*Attorney, Agent, or Firm*—Burton, Parker & Schramm

[57] ABSTRACT

Described is a one package adhesive stable at ambient temperature and pressure comprising;

a. a liquid phase comprising a polymerizable epoxy resin in the liquid state, an organic plasticizer capable of solubilizing the epoxy resin in an amount sufficient to impart flow to the adhesive;

b. a solid phase comprising a carboxy reactive polyvinyl chloride and an effective catalytic amount of the reaction product of a saturated aliphatic polyamine and a saturated aliphatic carboxylic acid or anhydride or an aromatic or cycloaliphatic acid or anhydride. The one package adhesive is capable of being stable for long periods of time without curing thereof and is useful as an adhesive for securing metallic substrates.

9 Claims, No Drawings

ONE PACKAGE STABLE ADHESIVE AND METHOD OF USING THE ADHESIVE

BACKGROUND OF THE INVENTION

The present invention is concerned with adhesives, in particular adhesives useful in the transportation industry, such as the automotive industry. Due to the significant increase in the need to have lower weight cars, more and more use of adhesives is being found in the manufacture of automobiles. One area where adhesives are particularly advantageous is in the use as a replacement for welding that occurs during the manufacturing and assembling of automobiles or trucks. Additionally, one package stable adhesives are particularly desirable for their ease in handling. It is likewise desirable if the adhesive may cure at a low temperature.

SUMMARY OF THE INVENTION

All of the difficulties described above can be overcome by the utilization of a one package adhesive stable at ambient temperature and pressure comprising;

a. a liquid phase comprising a polymerizable epoxy resin in the liquid state, an organic plasticizer capable of solubilizing the epoxy resin in an amount sufficient to impart flow to the adhesive; and b. a solid phase comprising a carboxy reactive polyvinyl chloride and an effective catalytic amount of the reaction product of a saturated aliphatic polyamine and a saturated aliphatic carboxylic acid or anhydride or an aromatic or cycloaliphatic acid or anhydride. The one package adhesive is capable of being stable for long periods of time without curing thereof and is useful as an adhesive for securing metallic substrates. Most preferably, the By "one package" is meant that the total combination of liquid and solid components are blended together in one container and is a stable mixture at ambient temperature and pressure.

By "flow" is meant the ability to work or handle the adhesive in the liquid state.

DESCRIPTION OF PREFERRED EMBODIMENTS

In the preparation of the one package adhesive system of the present invention, epoxy resins that are liquid at ambient temperature and pressure are employed. It is preferred that the epoxy be the reaction product of epichlorohydrin and bisphenol and is generally available in the trade under the name ARALDITE 6010 (trademark of Ciba-Geigy Corporation).

The epoxy resins which are employed in the composition are those derived by reacting a dihydric phenol and an epihalohydrin. Suitable reactants include bis(4-hydroxyphenyl) dimethyl methane and epichlorohydrin. Other suitable dihydric phenols include resorcinol; 1,1-bis(4-hydroxyphenyl) ethane; 1,1-bis(4-hydroxyphenyl) propane; 1,1-bis(4-hydroxyphenyl) butane; 2,2-bis(4-hydroxyphenyl) butane and 1,1-bis(4-hydroxyphenyl) 2-methyl propane.

Typical epoxy resins are those having an epoxy equivalent weight of between about 170 and 210. Illustrative commercial resins which are suitable in the practice of this invention include the following:

| Epoxy Resin | Epoxide Equivalent Weight | Viscosity (cps. at 25° C.) |
| --- | --- | --- |
| Epi-Rez 510 | 180–200 | 10,000–16,000 |
| Epon 828 | 180–195 | 10,000–16,000 |
| D.E.R. 336 | 186–192 | 11,000–14,000 |
| Epi-Rez 507 | ~194 | ~550 |
| D.E.R. 336 | 182–192 | 4,000–8,000 |
| Epon 820 | 180–195 | 4,000–10,000 |

Each of the above resins is prepared by the reaction of epichlorohydrin and bis(4-hydroxyphenyl) dimethyl methane.

An effective epoxy resin is a mixture of Epi-Rez 510 and Epi-Rez 507. Epi-Rex 510 is obtained by reacting epichlorohydrin and bis(4-hydroxyphenyl) dimethyl methane. Epi-Rez 507 is the reaction product of Epi-Rez 510 and ethylene glycol. The latter resin lends flexibility to the composition but must be used in controlled amounts. It has been found that the ratio of Epi-Rez 510 to Epi-Rez 507 may vary from 20/80 parts by weight with good results. When the quantity of Epi-Rez 507 is more than 88 parts, the resin after curing is gel-like and weak, and when the amount is less than 80 parts, the composition cures to a brittle, easily cracked material.

The epoxy material utilized can be any monomeric or polymeric compound or mixture of compounds having an average of one or more epoxy groups per molecule. The monoepoxides can be utilized, but it is preferred that the epoxy compound be polymeric and that the polyepoxide contain one or more epoxy groups per molecule, that is, have an epoxy equivalent greater than 1. The epoxy can be essentially any of the well known epoxides. A particularly useful class of polyepoxides are the polyglycidyl ethers of polyphenols such as Bisphenol A. These can be produced, for example, by etherification of a polyphenol with epichlorohydrin or dichlorohydrin in the presence of an alkali. The phenolic compound may be, for example, bis(4-hydroxyphenyl) 2,2-propane, 4,4'-dihydroxybenzophenone, bis(4-hydroxyphenyl) 1,1-ethane, bis(4-hydroxyphenyl) 1,1-isobutane, bis(4-hydroxytertiarybutylphenyl)2,2-propane, bis(2-hydroxynaphthyl)methane, 1,5-dihydroxynaphthylene, or the like. In many instances, it is desirable to employ such polyepoxides having somewhat higher molecular weight and containing aromatic groups. These can be provided by reacting the polyglycidyl ether above with a polyphenol such as Bisphenol A.

While the polyglycidyl ethers of polyphenols may be employed per se, it is frequently desirable to react a portion or the reactive sites (e.g., hydroxyl or, in some instances, epoxy) with a modifying material to vary the film characteristics of the resin. For example, the polyepoxides can be esterified with carboxylic acids, especially fatty acids. Especially preferred are saturated fatty acids and especially pelargonic acid.

Another quite useful class of polyepoxides are produced similarly from novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-propylene glycol, 1,5-pentanediol, 1,2,6-hexanetriol, glycerol, bis(4-hydroxycyclohexyl)2,2-propane and the like. There can also be used polyglycidyl esters of polycarboxylic acids, which are produced by the reaction of epichlorohydrin or similar epoxy compounds with an aliphatic or aromatic polycarboxylic acid such as oxalic acid, succinic acid, glutaric acid, terephthalic acid, 2,6-naphthylene dicarboxylic acid, dimerized linolenic acid and the like. Examples are glycidyl adipate and glycidyl phthalate. Also useful are polyepoxides derived from the epoxidation of an olefinically unsaturated alicyclic compound. Included are diepoxides comprising in part one or more monoepoxides. These polyepoxides are non-phenolic and are obtained by the epoxidation of alicyclic olefins; for example, by oxygen and selected metal catalysts, by perbenzoic acids, by acetaldehyde monoperacetate, or by peracetic acid, and/or hydrogen peroxide. Among such polyepoxides are the epoxy alicyclic ethers and esters which are well known in the art.

Another class of polyepoxides which may be employed is acrylic polymers containing epoxy groups. Preferably these acrylic polymers are polymers formed by copolymerizing an unsaturated epoxy-containing monomer, such as, for example, glycidyl acrylate or methacrylate, a hydroxyl-containing unsaturated monomer and at least one other unsaturated monomer.

Another class of epoxies are the cycloaliphatic epoxies whereby a saturated cycloaliphatic ring (e.g., 5 or 6 members) is fused to an oxirane ring, such as the bicyclo[4,1,0]-heptane-7-oxy or the bicyclo[3,1,0]-hexane-6-oxy.

With respect to the other portion of the liquid phase of the one package adhesive, the plasticizer that is employed is one that has the ability of solubilizing the epoxy liquid. Plasticizers are well known in the art. See Federation Series on Coatings Technology, Unit 22 on Plasticizers, published by Federation of Societies for Paint Technology, April, 1974. Exemplary plasticizers are the phosphoric acid esters such as cresyl diphenyl phosphate, tricresyl phosphate, and the like, phthalic anhydride esters, such as butyl octyl phthalates, butyl 2-ethylhexyl phthalate, butyl n-octyl phthalate, dibutyl phthalate, diethyl phthalate, diisodecyl phthalate, dimethyl phthalate, dioctyl phthalate, di(2-ethyl hexyl) phthalate, diiso-octyl phthalate, tridecyl phthalate, n-decyl phthalate, n-octyl n-decyl phthalate and the like; trimellitic acid esters, such as triisooctyl trimellitate, tri-n-octyl n-decyl trimellitate, trioctyl trimellitate and the like; acyclic plasticizers, such as adipic acid esters, such as di[2-(2 butoxyethoxy)ethyl]adipate, di(2-ethylhexyl) adipate, diisodecyl adipate, dioctyl adipate, n-hexyl n-decyl adipate, n-octyl n-decyl adipate and the like; di(2 ethylhexyl) azelate, epoxidized esters such as epoxidized soya oils, such as octyl epoxy tallates and the like; glycerol monoricinoleate, isopropyl myristate; oleic acid esters, such as butyl oleate, methyl oleate and the like; phosphoric acid esters; sebacic acid esters, such as dibutyl sebacate and di(2-ethylhexyl) sebacate; stearic acid esters, such as n-butyl stearate and the like; triethylene glycol di(caprylate-caprate) and the like. Of the above enumerated plastizers, the phthalates, in particular dioctyl phthalates are preferred.

With respect to the solid phase of the one package adhesive system, one may employ the reaction product of the polyamine and the polycarboxylic acid or anhydride which are well known products. The preparation of these products is described in U.S. Pat. No. 3,639,657 which is hereby incorporated by reference.

Preferably, the reaction product is prepared by a condensation reaction to produce a polyamide wherein the polyamine is comprised of saturated aliphatic amines. The polyamines are generally of the structure $(R_1)(R_2)N-R_3-N(R_4)(R_5)$ where $R_1$, $R_2$, $R_4$, and $R_5$ are independently selected from the groups consisting of hydrogen and alkyl of 1 to 6 carbon atoms, and $R_3$ is selected from the group consisting of (i) saturated alkylene groups from 2 to 8 carbon atoms; (ii) a cyclic structure including the amino groups such as piperazine and the like; (iii) compounds of the structure

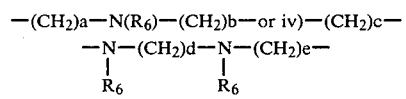

wherein a, b, c, d, and e independently are intergers ranging from 1 to 4, and $R_6$ may be hydrogen or alkyl of 1 to 6 carbon atoms.

Suitable amines are ethylene diamine, diethylene triamine, triethylene tetraamine, 1,6-diamino hexane, 1,3-diamino propane, imino-bis(propyl amine), methyl imino-bis(propyl amine) and the like.

The polycarboxylic acid or anhydride may be saturated aliphatic or cycloaliphatic or aromatic and may contain from 3 to 12 carbon atoms such as citric acid, phthalic anhydride, hexahydrophthalic anhydride, tetrahydrophthalic anhydride, methyl-tetrahydrophthalic anhydride and the saturated aliphatic polycarboxylic acids and anhydrides such as oxalic, malonic, succinic, glutaric, adipic, pimelic, suberic, azelaic, sebacic and the like.

Most preferably, the polyamide that is employed is one that is a low molecular weight product preferably less than 1,000, even more preferably less than 500. Additionally, the reaction product is preferably water soluble.

The preferred material has the chemical description:

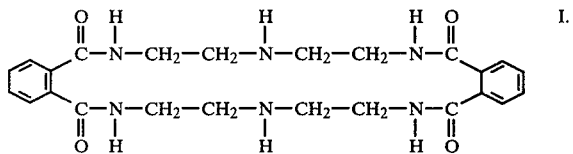

The material (I) is powder at ambient temperature and pressure having a melting range of 96° to 113° C. with an actual amino nitrogen percentage of 7.12–9.07%, with a moisture content of about 2%, and with amino nitrogen about 6.1% by theory.

One of the solid phase components of the one package adhesive system is polymerized polyvinyl chloride (PVC) which has active carboxyl groups therein. In other words, the polymerized PVC has carboxyl groups that can assist in the cross-linking with the other components of the plasticizing composition to give the final cured adhesive. Such carboxyl modified vinyl chloride polymers are readily available in the trade. A suitable polymer is GEON 130X17 resin (trademark of B. F. Goodrich Company for vinyl chloride dispersion resin) which has a carboxyl content of 1.67 grams to 100 grams of resin and a particle size such that 100% would pass through a 200 U.S. mesh screen. In general it is believed that the polymer of vinyl chloride is prepared by copolymerizing vinyl chloride with a carboxyl containing monomer such as maleic acid or anhydride or other similar acids or anhydrides, optionally together with vinyl acetate, acrylonitrile, vinylidene chloride and the like.

The amount of plasticizing agent that is employed is normally an effective amount to solubilize the epoxy resin and at the same time to impart flow to the total composition at ambient temperature and pressure. Therefore, the viscosity would range rather substantially. The amount of carboxy reactive PVC likewise can vary substantially from generally an effective amount to produce cross-linking of the total product to the ratio described below.

Lastly, the curing agent is used in an effective amount to produce curing of the epoxy agent. Most preferably, the ratio of epoxy material:epoxy curative:carboxy reactive PVC:plasticizer is in the amount of 0.5–5:0.5–3:0–.5–5:0.5–3, most preferably 3:1:3.1:1. Generally the liquid phase and solid phase are preferably about equal weight, i.e., ratio of one. The higher the liquid phase the lower the adhesion properties and lower the tensile strength of the adhesive.

It is to be appreciated that other various inert materials may be added to improve the properties of the composition, such as reinforcing pigments, plasticizers, UV stabilizers, vinyl chloride stabilizers and the like. Additionally, other catalysts or agents may be added to increase the curing speed of the composition.

Suitable stabilizers may be lead phosphate, lead phthalate, organic phosphites, organic phosphates, castor oil derivatives, zinc and its oxides, and other vinyl stabilizers as long as they do not interfere with the adhesion of the composition to the substrate.

Suitable pigments and fillers may be calcium carbonate, titanium dioxide, barium-calcium, calcium magnesium carbonate and the like.

The composition of the present invention is used by applying it to a first substrate, such as a metallic substrate. The substrate may be zinc, iron, aluminum, magnesium, steel and the like, or other substrates, such as wood, glass, plastic synthetic resin and the like. Thereafter, a second substrate is applied thereto and the entire structure is then subjected to heat in order to cure the system. During the assembly and manufacture of transportation vehicles, such as automobiles, trucks and the like, the present composition is used in place of welding at a number of sites on metal substrates.

One of the distinct advantages of the present weld replacement adhesive is that it has the ability to withstand paint stripping from the substrate and the reapplication of paint thereto. This emphasizes the stability of the weld replacement adhesive of the present invention. Additionally, the adhesive may be applied to an oily surface such as that which is present on aluminum substrates used in the transportation industry. In such a situation, the oil is generally compatible with the plasticizer in the adhesive and, therefore, very good bonding to the metal is obtained. Such is not the case with other adhesives that do not contain the components of the present invention.

The epoxy curatives which are amides that are useful as curing catalysts for the present composition have the particular advantage that it is a solid at ambient temperature and therefore the total composition is stable at room temperature and pressure for long periods of time and therefore can be shipped and handled with little or no difficulty. It is only when the temperature approximates 65° C. and above that the catalyst melts and is dissolved into the liquid phase thereby causing the catalytic reaction to occur and the curing of the composition.

One of the distinct advantages of the present adhesive is that it has the tendency to adhere very tenaciously to the substrates, such as a metallic substrate as aluminum and steel. Shear strengths in the order of 1000 to 1500 psi have been routinely obtained using the composition of the present invention.

Having described the invention in general terms, listed below are further embodiments of the invention wherein all temperatures are in degrees Fahrenheit and all parts are parts by weight, unless otherwise indicated.

EXAMPLE 1

A one package adhesive was formulated as follows:

| Formulation | Percentage (Wt.) | Parts by Weight |
| --- | --- | --- |
| HY 940 | 26.0% | 10.7 (Hardener) |
| combination of epoxy (59%) and hardener (41%) | | |
| ARALDITE 6010 (epoxy) | 15.5% | 30.8 |
| Santicizer 261 | 10.5% | 10.5 |
| alkyl benzyl phthalate | | |
| Lead Phosphate Stabilizer | 1.0% | 1.0 |
| GEON 130 × 17 (vinyl polymer) | 39.0% | 39.0 |
| Thickener | 8.0% | 8.0 |
| (santicizer 261 : castor oil derivative in a 2:1 relationship) | | |

The ratio of epoxy to hardener to vinyl is approximately 30.3:10.7:39.

The epoxy curative is a solid polyamide at ambient temperature and pressure identified above as Component I (page 7) and is present in the liquid epoxy resin. The vinyl resin is GEON 130X17.

The above composition was applied to a aluminum substrate and a second aluminum substrate applied thereto. The substrates were then subjected to heat of about 350° F. for 20 minutes. The shear strength of the adhesive was 1580 psi.

It is to be appreciated that the metallic substrate may be subject prior to the application of the adhesive to the normal cleaning operations that are performed in the transportation industry and likewise subjected to a phosphate corrosion resistant wash, painted and the like.

The curing generally occurs at a temperature greater than about 65° C. (about 150° F.) and preferably from about 250° F. to about 500° F. (121.1° C.–260° C.) for a period of time ranging from about 1 minute to an hour. The higher the temperature employed, the shorter the period of time.

What is claimed is:

1. A one package adhesive stable at ambient temperature and pressure consisting essentially of;
   a. a liquid phase consisting essentially of a polymerizable epoxy resin in the liquid state, an organic plasticizer capable of solubilizing the epoxy resin in an amount sufficient to impart flow to the adhesive; and
   b. a solid phase consisting essentially of a carboxy reactive polyvinyl chloride and an effective catalytic amount of the reaction product of a saturated aliphatic polyamine and a saturated aliphatic carboxylic acid or anhydride or an aromatic or cycloaliphatic acid or anhydride.

2. The adhesive of claim 1 wherein the ratio of epoxy:plasticizer:PVC:curing agent ranges from about 0.5–5:0.1–3:0.5–5:0.1–3.

3. The adhesive of claim 1 wherein the plasticizer is a dialkyl phthalate.

4. The adhesive of claim 1 wherein the curing agent is a compound of the formula:

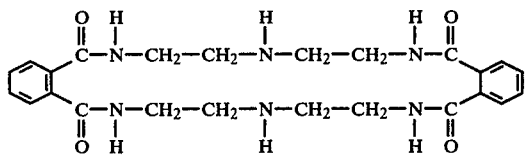

5. The adhesive of claim 1 wherein the epoxy is the reaction product of a bisphenol and epichlorohydrin.

6. The adhesive of claim 1 wherein the catalyst is the reaction product of phthalic anhydride and an aliphatic polyamine.

7. The adhesive of claim 1 wherein the weight ratio of (a):(b) is one.

8. A method for securing substrates to each other comprising the steps:
 1. applying the composition of claim 1 to a first substrate;
 2. heating the substrate to a temperature of at least 65° C., thereby liquifying the solid amine curative; and
 3. curing the composition.

9. The process of claim 8 wherein the curing occurs at a temperature ranging from about 250° to about 500° F.

* * * * *